United States Patent
Muraoka et al.

[11] Patent Number: 6,063,218
[45] Date of Patent: May 16, 2000

[54] BEARING MANUFACTURING METHOD

[75] Inventors: Tomoki Muraoka; Masayuki Kobayashi, both of Kanagawa, Japan

[73] Assignee: NSK Ltd., Tokyo, Japan

[21] Appl. No.: 08/103,915

[22] Filed: Aug. 10, 1993

[30] Foreign Application Priority Data

Aug. 10, 1992 [JP] Japan ..................... 4-212993

[51] Int. Cl.⁷ .............. B21K 1/02; F16C 17/00
[52] U.S. Cl. .............. 148/906; 148/333; 148/526; 148/589; 148/639
[58] Field of Search ............ 148/526, 566, 148/333, 906, 586, 589, 639; 420/104

[56] References Cited

U.S. PATENT DOCUMENTS 5,077,003  12/1991  Muraoka et al. ............ 148/333

FOREIGN PATENT DOCUMENTS 60-230960  11/1985  Japan .
63-216952   9/1988  Japan .
2-290640   11/1990  Japan .
1089232    11/1967  United Kingdom .

*Primary Examiner*—Sikyin Ip
*Attorney, Agent, or Firm*—Sughrue, Mion, Zinn, Macpeak & Seas, PLLC

[57] ABSTRACT

In a method of manufacturing a bearing, a high-frequency hardened steel essentially containing the following elements in the following percentage by weight is employed as the material of at least one of the outer and inner races of the bearing which is drilled, C; 0.5 to 0.65%, Si; 0.07 to 0.15%,
Mn; 0.05 to 0.35%, Cr; 0.25 to 0.55%, and
B; 0.0035% or less, a workpiece 10 Hv 230 in maximum hardness is formed with the high-frequency hardened steel subjected to hot forging, a part of the workpiece where a hole 12 is to be formed is drilled, and a part of the workpiece 10 where a track 14 is formed is subjected to high-frequency hardening until it becomes at least Hv 653 in hardness. The workpiece formed with the steel material subjected to hot forging is not larger than Hv 230 in maximum hardness. Hence, the workpiece can be drilled without reduction of the service life of the drilling tool, and the track region of the bearing has a hardness value which is practical in use.

2 Claims, 1 Drawing Sheet

BEARING MANUFACTURING METHOD

BACKGROUND OF THE INVENTION

This invention relates to a method of manufacturing a bearing in which a high-frequency hardened steel is used the composition of which does not reduce the service life of a drilling tool even if the steel is not annealed after being forged at a high temperature.

Heretofore, the flanged outer race of a bearing which is drilled, such as a hub unit ball bearing coupled to the axle of an automobile, is manufactured by using a high-frequency hardened such as SAE 1070. This steel material is a high carbon steel. Therefore, when a workpiece for manufacturing the bearing is formed with the steel material subjected to hot forging, the workpiece is high in hardness; that is, it is difficult to drill the workpiece. Hence, the hardness of the workpiece is adjusted by annealing it. That is, it is necessary to anneal the workpiece before drilling it.

However, annealing takes a relatively long period of time, thus being one of the causes which lower the productivity. Therefore, there has been a demand for provision of a bearing manufacturing method in which the annealing process is omitted.

On the other hand, as long as the conventional high-frequency hardened steel is used, even if the annealing process is omitted the bearing manufacturing method suffers from the following problem: That is, when the workpiece which is high in hardness, is drilled with a conventional drilling tool, the service life of the drilling tool is greatly reduced.

SUMMARY OF THE INVENTION

Accordingly, an object of this invention is to eliminate the above-described difficulty accompanying a conventional bearing manufacturing method. More specifically, an object of this invention is to provide a bearing manufacturing method in which a high-frequency hardened steel material is used whose chemical composition is such that, even when a workpiece formed with the steel material subjected to hot forging is not annealed, its hardness is suitable for drilling.

In order to achieve the foregoing object, in a bearing manufacturing method according to the invention, a high-frequency hardened steel essentially containing the following elements in the following percentage by weight is employed as the material of at least one of the outer and inner races of the bearing which is drilled:

C; 0.5 to 0.65%, Si; 0.07 to 0.15%,

Mn; 0.05 to 0.35%, Cr; 0.25 to 0.55%, and

B; 0.0035% or less, a workpiece of Hv 230 in maximum hardness is formed with the high-frequency hardened steel subjected to hot forging, a part of the workpiece where a hole is to be formed is drilled, and a part of the workpiece where a track for rolling elements or a slide region for a mating member is formed is subjected to high-frequency hardening until the part becomes at least Hv 653 in hardness.

The weight percentage of the elements of the high-frequency hardened steel is based on the following reasons:

If C is larger than 0.65% by weight, then the workpiece formed with the material subjected to hot forging will be higher than Hv 230 in hardness; and if less than 0.50% by weight, then it will be lower than Hv 653 after high frequency induction hardening in hardness. The percent by weight of C is preferably in a range of from 0.50 to 0.58%, and more preferably in a range of 0.54 to 0.58%.

The element Si is used as a deoxidizer. The upper limit is 0.15% by weight which does not affect the hot forging characteristic. The lower limit should be as small as possible so that the resultant workpiece is low in ferrite hardness and suitable for machining. In practice, the most suitable range is from 0.07 to 0.1% by weight.

The element Mn greatly affects the hardenability. If it is smaller than 0.05% by weight, then it will not contribute to improvement of the hardenability. If, on the other hand, it is larger than 0.35% by weight, then the workpiece formed with the steel material subjected to hot forging is not smaller than Hv 230 in maximum hardness. Thus, Mn is preferably in a range of 0.20 to 0.35% by weight, and more preferably in a range of 0.20 to 0.25%.

The element Cr contributes to improvement of the hardenability. It is up to 0.55% by weight so that it may not adversely affect the hot forgeability. Preferably it is in a range of from 0.25 to 0.50% by weight, more preferably in a range of from 0.30 to 0.35% by weight. However, in the case where B is not added, it is preferable that the lower limit of Cr is 0.25% by weight.

A small quantity of B is effective in improving the hardenability. If it is larger than 0.0035%, then the improvement of the hardenability is lowered. Therefore, the percent by weight of B is 0.0035% in maximum.

A high-frequency hardened steel material of the above-described chemical composition is subjected to hot forging, and air cooling, to form a workpiece having a predetermined configuration. The workpiece thus formed is not larger than Hv 230 in maximum hardness.

Thus, the workpiece dispenses with the annealing process which is heretofore required for adjusting the hardness. That is, the workpiece can be drilled as it is, without reducing the tool life of the drilling tool.

The workpiece thus drilled is hardened by high frequency current and tempered. More specifically, the inner cylindrical surface where the track for the balls (or rolling element) is formed, is subjected to high-frequency hardening and tempering. In the workpiece, the quantity of carbon is at least 0.50% by weight, and therefore the track surface hardened is Hv 653 or higher in hardness. This hardness allows the resultant bearing to perform its function satisfactorily.

DETAILED DESCRIPTION OF THE PREFERRED EMBODIMENTS

For a full understanding of the invention, examples together with comparative examples will be described.

Examples and Comparative Examples

The chemical compositions of the examples of the invention and those of the comparative examples are as indicated in the following Table 1:

TABLE 1

Unit: % by weight

| Steel Material | | C | Si | Mn | P | S | Cr | Al | Ti | B | Remarks |
|---|---|---|---|---|---|---|---|---|---|---|---|
| Comparative Example | A | 0.68 | 0.22 | 0.87 | 0.012 | 0.019 | 0.20 | 0.025 | <0.01 | — | SAE1070 |
|  | B | 0.54 | 0.23 | 0.84 | 0.014 | 0.021 | 0.18 | 0.019 | <0.01 | — | JIS.S53C |
| Concrete Example | C | 0.55 | 0.08 | 0.31 | 0.012 | 0.018 | 0.49 | 0.022 | <0.01 | — | |
|  | D | 0.53 | 0.07 | 0.31 | 0.013 | 0.019 | 0.30 | 0.020 | 0.034 | 0.0011 | |

As indicated in Table 1, a comparative example A is a base steel corresponding, and a comparative example B is a steel material corresponding to JIS S53C. The percent by weight of C and that of Cr are within the ranges specified by the invention, but the percent by weight of Si and that of Mn are not in the ranges specified by the invention.

An example C is a steel material which is obtained by processing the material of the comparative example B as follows: That is, in the material of the comparative example B, the quantities of Si and Mn, which are ferrite strengthening elements, are decreased thereby to lower the hardness of the material subjected to hot forging and air cooling, and in order to compensate for the reduction in hardenability which is caused by this decrease, the quantity of Cr is increased. An example D is a steel material which is smaller in the increment of Cr than the steel material of the example C, and improved in hardenability by addition of B.

Figure 1:
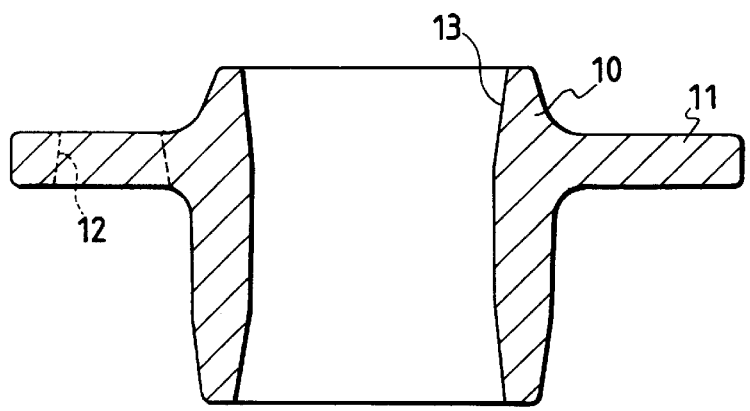
FIG. 1 is a vertical sectional view showing one example of a workpiece which is formed with a high-frequency hardened subjected to hot forging according to the invention.

The steel materials listed in Table 1 were forged at the same temperature (about 1150° C.), and formed into workpieces 10 as shown in FIG. 1 each of which is the original of the outer race of a hub unit ball bearing. Outer race of hub unit ball bearing (workpieces) forged at high temperature were not annealed but were air-cooled. Of the workpieces which used the comparative example A material, two workpieces were formed, one was forged at high temperature and not annealed, and the other was forged in the same way, and annealed at 660° C. for four hours.

The hardnesses Hv of the sections of the flanges 11 of the workpieces 10 were measured. The results of the measurement are as indicated in Table 2 below. In the hardness measurement, a test load of indenter against the flange 11 was 20 kg.

Next, the workpiece of the comparative example A which was annealed with the steel material A, and the workpieces of the comparative example B and the examples C and D which were hot forged with the steel materials B, C, D and were subjected to air cooling, were machined into new workpieces having a predetermined configuration. Those new workpieces were drilled to have hub bolt holes 12 in the flanges 11 by using drilling tools. The wear lives of those drilling tools were compared with one another.

The above drilling test was carried out as follows: A numerical control bed type vertical milling machine was used for automatically feeding the specimens, and two kinds of drills, namely, a high speed steel tool and a carbide tool were used. The drilling was performed under the following conditions:

(1) Drilling with the high speed steel tool
 Tool: Corresponding to SKH 56, 6 OD, TiN coating twist drill
 Cutting speed: 20 m/min
 Feeding speed: 0.1 mm/rev
 Lubricant: Non-water-soluble cutting lubricant
 Drilling depth: 10 mm, penetrated (2) Drilling with the carbide tool
 Tool: Corresponding to P 30, 6 OD, TiN coating twist drill
 Cutting speed: 47 m/min
 Feeding speed: 0.3 mm/rev
 Lubricant: Non-water-soluble cutting lubricant
 Drilling depth: 10 mm, penetrated The tool lives of the drills were determined as follows: The number of holes which the tool could form until the cutting edge was worn out or chipped was counted. That is, in the case of the high speed steel drill, after 210 holes were

TABLE 2

| Steel Material | Hardness after forging | | | | Hardness after annealing | | | |
|---|---|---|---|---|---|---|---|---|
| | Number of Workpieces Measured | Average Value | Minimum Value | Maximum Value | Number of Workpieces Measured | Average Value | Minimum Value | Maximum Value |
| A | 20 | 284 | 262 | 304 | 20 | 244 | 236 | 254 |
| B | 20 | 245 | 230 | 266 | | | | |
| C | 20 | 208 | 198 | 222 | | | | |
| D | 20 | 193 | 186 | 198 | | | | |

As is apparent from Table 2, in each of the comparative examples A and B, the maximum hardness Hv of the flange is over 230; whereas in each of the examples C and D, the maximum hardness Hv of the flange is smaller than 230.

drilled, the cutting edge was observed every time thirty (30) hole were drilled; whereas in the case of the carbide drill, after 1500 holes were drilled, the cutting edge was observed every time one hundred holes were drilled. The results of the observations are as indicated in the following Table 3 and Table 4:

TABLE 3

| Steel Material | Pretreatment | Flange Hardness (Hv 20 kg) | Tool Life Number of Holes | Tool Life Life Ratio | Reason for determination of the Life |
|---|---|---|---|---|---|
| A | Annealed | 236–254 | 360 | 1 | The outer periphery of the cutting edge, worn out more than 0.5 mm at the corner. |
| B | As forged (not annealed) | 230–266 | 420 | 1.1 | |
| C | " | 198–222 | 1050 | 2.9 | |
| D | " | 186–198 | 1200 | 3.3 | |

TABLE 4

| Steel Material | Pretreatment | Flange Hardness (Hv 20 kg) | Tool Life Number of Holes | Tool Life Life Ratio | Reason for determination of the Life |
|---|---|---|---|---|---|
| A | Annealed | 236–254 | 1900 | 1 | The outer periphery of the cutting edge, clipped off. |
| B | As forged (not annealed) | 230–266 | 2000 | 1.05 | |
| C | " | 198–222 | 3000 | 1.5 | |
| D | " | 186–198 | 3300 | 1.7 | |

As is seen from Table 3 and Table 4, in the case where the high speed steel drill was used to form holes in the specimens of the examples C and D, its tool life was more than about three times that which was detected in the case where it was used to cut holes in the specimens of the comparative examples A and B; and in the case where the carbide drill was used to form holes in the specimens of the examples C and D, its tool life was more than about 1.5 times that which was detected in the case where it was used to cut holes in the specimens of the comparative examples A and B. In addition, the following fact can be read from Table 3 and Table 4: That is, in the case where the specimen was Hv 230 or less in maximum hardness even when it was not annealed, the tool life of the tool is greatly lengthened.

The specimens drilled as described above were subjected to high frequency hardening and to annealing. More specifically, the track 14 of each specimen for the balls (or rolling elements) had been formed on the inner cylindrical surface, and were hardened with high frequency current and tempered. The high frequency hardening operation was carried out, in one action, at a constant temperature under the following conditions:

Frequency: 30 kHz
Voltage: 13 kV
Current: 14 A
Heating time: 9 sec
Cooling water flow rate: 60 l/min
Cooling time: 10 sec The specimens were annealed at 160° C.

The track region 14 of each of the specimens which had been subjected to high frequency hardening and to tempering in the above-described manner was tested for hardness and hardening depth. The results of the test are as indicated in FIG. 2.

Figure 2:
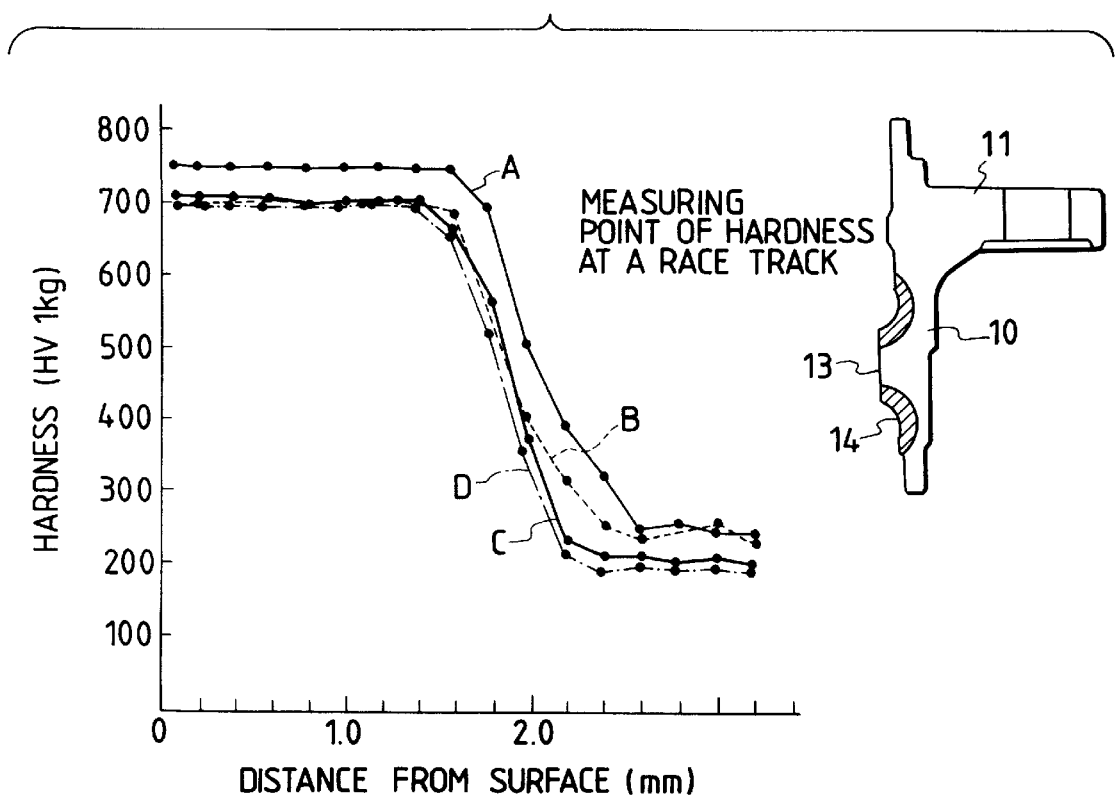
FIG. 2 is a diagram for a description of a high-frequency hardening process for the track regions of specimens, and indicating relationships between hardness and hardening depth thereof.

As is apparent from FIG. 2, the track regions 14 of the specimens of the examples C and D were not so different in hardness from those of the specimens of the comparative examples A and B; that is, they are more than Hv 653 in hardness which is suitable in practical use.

While the invention has been described with reference to the outer race of a hub unit ball bearing, it should be noted that the invention is not limited thereto or thereby. For instance, the technical concept of the invention is applicable to the inner race of a rolling bearing, and to a sliding bearing having a sliding region for the mating member.

As was described above, in the bearing manufacturing method of the invention, the high-frequency hardened steel material, which is the material of at least one of the inner and outer races of the bearing, is specified in composition and in weight percentage. Therefore, the workpiece formed with the steel material subjected to hot forging is not larger than Hv 230 in maximum hardness. Hence, the workpiece can be drilled without reduction of the service life of the drilling tool. In addition, the track portion of the workpiece which is hardened by high frequency current is maintained at Hv 653 or higher in hardness for suitable in practical use. Thus, the bearing which is equivalent in performance to the conventional one can be manufactured without the annealing process. Those effects or merits should be highly appreciated in practical use.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A bearing comprising an inner race and an outer race,
   at least one of the inner and outer races being integrally formed with a flange which is to be worked by a machining tool,
   at least one of the inner and outer races of said bearing being made of an alloy steel which consists essentially of:
   0.5 to 0.65% by weight of C;
   0.07 to 0.15% by weight of Si;
   0.05 to 0.35% by weight of Mn;
   0.25 to 0.55% by weight of Cr;

0.0035% by weight or less of B, selectively; and the balance being Fe, said flange being made to be less than Hv 230 in maximum hardness after being formed by hot forging and cooling to a room temperature in one of the inner and outer races, and at least a race track of said one of said inner and outer races, where a rolling groove for rolling elements or a sliding region for a mating member is formed and hardened, said race track being at least Hv 653 in hardness after a hardening treatment.

2. A bearing according to claim 1, wherein the race track is hardened by a high-frequency hardening treatment.

* * * * *